(12) United States Patent
Johnson

(10) Patent No.: US 8,694,454 B2
(45) Date of Patent: Apr. 8, 2014

(54) METHODS, APPARATUS AND SYSTEMS FOR GENERATING, UPDATING AND EXECUTING A VEGETATION CONTROL PLAN

(75) Inventor: Jerome Dale Johnson, Waterville, MN (US)

(73) Assignee: Superior Edge, Inc., Mankato, MN (US)

( * ) Notice: Subject to any disclaimer, the term of this patent is extended or adjusted under 35 U.S.C. 154(b) by 167 days.

(21) Appl. No.: 13/372,473

(22) Filed: Feb. 13, 2012

(65) Prior Publication Data

US 2012/0215729 A1    Aug. 23, 2012

Related U.S. Application Data

(60) Provisional application No. 61/443,855, filed on Feb. 17, 2011.

(51) Int. Cl.
*G06N 3/02* (2006.01)
*G06F 17/30* (2006.01)

(52) U.S. Cl.
CPC ............ *G06N 3/02* (2013.01); *G06F 17/30463* (2013.01)
USPC ........................................................... 706/45

(58) Field of Classification Search
USPC ........................................................... 706/45
IPC .............................. G06N 3/02; G06F 17/30463
See application file for complete search history.

(56) References Cited

PUBLICATIONS

Lindgren, Addressing the Threats of Invasive Plants Through Spatial Predictive Modeling and Early Detection and Rapid Response, Proceedings of the Weeds Across Borders 2008 Conference, May 27-30, 2008, pp. 98-107.*

* cited by examiner

*Primary Examiner* — Wilbert L Starks
(74) *Attorney, Agent, or Firm* — Kinney & Lange, P.A.

(57) ABSTRACT

Vegetation control plans may be automatically generated using vegetation control information received from a variety of sources. Such vegetation control plans may aid farmers, other vegetation control personnel, and professionals when determining a vegetation control strategy, including treatment, and then guide the implementation of that strategy. Vegetation control plans may include a variety of recommended vegetation control practices and projected outcomes for the implementation of recommended vegetation control management practices.

42 Claims, 12 Drawing Sheets

US 8,694,454 B2

METHODS, APPARATUS AND SYSTEMS FOR GENERATING, UPDATING AND EXECUTING A VEGETATION CONTROL PLAN

RELATED APPLICATIONS

This application is a NONPROVISIONAL of, claims priority to and incorporates by reference U.S. Provisional Patent Application 61/443,855, filed 17 Feb. 2010.

FIELD OF THE INVENTION

The present invention relates to methods, graphical user interfaces (GUI), computer-readable media, and systems for dynamically generating, updating, and executing a vegetation control plan.

BACKGROUND

In recent years, there has been an explosive proliferation of data of all forms and formats related to treating unwanted vegetation. Unwanted vegetation is generally regarded as plant-based vegetation that is considered undesirable, unnecessary, and/or harmful to the area in which it is located or to other vegetation in proximity. The process of controlling unwanted vegetation involves a series of actions performed to reduce, remove, and/or prevent from re-growing said unwanted vegetation. The present invention is intended for use by farmers, agricultural producers, agricultural product suppliers, agricultural product buyers, and related consultants.

The ability to find and then combine the relevant data into a solution to control unwanted vegetation has traditionally been left to the initiative, inventiveness, know-how, and experience of the individual creating the solution. Typically, people creating solutions to vegetation control problems intuitively determine their strategies based on the results of blind internet searches, available resources, past experiences, local knowledge, and opinions. Or, in some instances, a person may hire a consultant or a supplier to assist in the development and execution of a vegetation control plan. However, these practices often result in outcomes that are less than optimal or even less than may otherwise be achievable because they fail to account for many aspects of vegetation control. These aspects include the efficient utilization of resources and available time, financial considerations of the vegetation control plan, logistics (including the organization and movement of equipment, people, and supplies), land characteristics and constraints (including possible environmental and regulatory requirements), neighboring vegetation control issues, and other factors that contribute to optimizing vegetation control and achieving the desired outcomes. In addition, there can be contractual obligations that need to be considered, as well as the wishes and needs of the landlords, landowners, buyers of an impacted crop, and in some cases the neighbors and the public at large.

SUMMARY OF THE INVENTION

The present inventor has recognized that intuitive vegetation control strategies do not leverage the benefits of remote sensing, social networking, and other systems and technologies. Nor do intuitive vegetation control strategies adapt well to unplanned events such as inclement weather, personnel issues, supply shortages, etc. In part, intuitive vegetation control plans suffer because it is difficult for people to modify their habits and practices in the face of broader trends and unplanned events. The present invention addresses these issues by generating, updating, and executing vegetation control plans that take into consideration a variety of such factors by employing technologies not previously exploited to such ends.

Methods, apparatus, and systems for generating, updating, and executing a vegetation control plan are herein discussed. Information regarding the vegetation control plan may be received from a variety of sources, such as a user, a database, a data feed, a social network, a piece of equipment used to execute a portion of the vegetation control plan and/or a remote sensor via a communication network, such as the Internet, a cloud computing network, a local area network (LAN), a wide area network (WAN), or a wireless LAN (WLAN).

The received information may be used to generate one or more vegetation control plans. Vegetation control plans may include, for example, a logistics plan that provides logistical options and instructions for the scheduling, movement, and use of equipment, supplies, people, and resources available for the execution of the vegetation control plan. It may also include site-specific recommendations and instructions, recommended treatments, maps to aid in execution, recommended resource use, recommended equipment use, supplier data, information regarding supplies required (e.g., biological products, chemicals, seed, fertilizer, fuel, etc.), buyer-requirements regarding the impacted crop(s), and recommended activities to be performed. The vegetation control plan may be updated over time and include status information of the portion of the vegetation control plan that has been completed, including data related to budgets, supplies consumed, supply inventory and shortages, resource capacity utilization, and accomplishments. In one embodiment, a vegetation control plan may include measures of plan effectiveness (e.g., an effectiveness index) and efficiencies (e.g., an efficiency index), times (e.g., a time index) and/or costs (e.g., a cost index).

One or more vegetation control plans may be evaluated by the vegetation control plan generator according to one or more criterion. A preferred vegetation control plan may then be selected by the vegetation control plan generator based upon the evaluation. The selected vegetation control plan may then be provided to the user via, for example, the communication network. In some cases, a plurality of vegetation control plans are selected and provided to the user. In other cases, a portion of a vegetation control plan may be provided to a user, an individual employee, or other designate of the user, or provided directly to the electronic systems of the equipment that is being used to execute all or a portion of the vegetation control plan.

In some instances, additional information regarding the selected vegetation control plan may be received from, for example, the user, the manager, the database, the data feed, the equipment, and/or the remote sensor. The additional information may relate to, for example, new treatment research, site conditions, weather, pricing for the supplies and resources, equipment and personnel availability, operating costs, or status information regarding the progress to that point in executing the plan. The selected vegetation control plan may then be dynamically updated based upon the received additional information and the updated vegetation control plan may be provided to the user via a communication network.

In one embodiment, the received information may relate to an outcome of executing a vegetation control plan and the vegetation control plan generator may determine a best practice for treating unwanted vegetation based on that outcome.

In another embodiment, a best practice may be received from, for example, a scientific researcher, a supplier, or an equipment manufacturer. The vegetation control plan may then be updated according to the best practice.

In another embodiment, the vegetation control plan may include multiple attributes or categories of information, such as site conditions and characteristics, which are determined visually (e.g., by a person in the field) and/or remotely sensed, and site availability and readiness upon which to execute the vegetation control plan. Other included attributes are data related to resources, including equipment, personnel, and supplies, available to execute the vegetation control plan, local knowledge, planned and unplanned events, weather data, supplies and services pricing data, and the like. On some occasions, an attribute of the received information may be determined and the received information may be incorporated into a corresponding attribute of the vegetation control plan. For example, when an attribute of the received information relates to the site's condition, it may be incorporated into a corresponding site condition attribute of the vegetation control plan.

On some occasions, the received information may include remotely sensed data including images of the site to be treated. Such images may be analyzed by, for example, the vegetation control plan generator and the condition of the site and adjacent area may be determined therefrom. A sequence of vegetation control treatment activities based on the determined condition of the area as well as other information may then be incorporated into the vegetation control plan.

In one embodiment, the potential impact of utilizing a particular resource, sequence, treatment practice, and/or schedule to execute a portion of the vegetation control plan may be determined and a recommendation may be provided to, for example, the user based upon the determined potential impact.

In some instances, the received information may include climate data, historical weather data, current weather data, and/or predicted weather data and the vegetation control plan may be dynamically updated as current weather data, and predicted weather data is received.

In another embodiment a set of instructions for execution of a portion of the vegetation control plan may be generated and provided to, for example, the user, the manager, the database, the data feed, the remote sensor, the supplier, and/or a piece of equipment utilized to execute a portion of the vegetation control plan. In some instances, the set of instructions may be specific to the user, the manager, the supplier, and/or the piece of equipment utilized to execute all or a portion of the vegetation control plan.

Exemplary systems provided herein include a vegetation control plan generator and a user interface communicatively coupled to one another via a communication network. The vegetation control plan generator may be configured to receive information regarding vegetation control treatment from, for example, a user, a manager, a data feed, a database, equipment, social network, and/or a remote sensor. The vegetation control plan generator may also be configured to generate a plurality of vegetation control plans for treating and controlling unwanted vegetation based upon the received information, evaluate the plurality of vegetation control plans according to one or more criterion, select a vegetation control plan responsively to the evaluation, and provide the selected vegetation control plan to a user through the user interface via a communication network.

The user interface may be configured to receive the selected vegetation control plan from the vegetation control plan generator via the communication network, provide the selected vegetation control plan to the user, receive the information regarding vegetation control treatment from the user, and provide the received information regarding vegetation control treatment to the vegetation control plan generator. Optionally, the system may further include a database communicatively coupled to the vegetation control plan generator that is configured to store the received information regarding vegetation control treatment, the plurality of vegetation control plans, and/or the selected vegetation control plan.

BRIEF DESCRIPTION OF THE DRAWINGS

The present application is illustrated by way of example, and not limitation, in the figures of the accompanying drawings, in which.

DETAILED DESCRIPTION

The present invention concerns methods and systems which collect, integrate, and process various types of data from various sources to generate a vegetation control plan that may be provided to and used by people engaged in vegetation control operations. Vegetation control plans generated in accordance with the present invention may include a variety of recommended treatment and control practices and projected outcomes resulting from the implementation of the recommended plan. In some embodiments, a user may be able to manipulate various aspects of a vegetation control plan in order to have the vegetation control plan generator hypothetically predict outcomes for implementation of various control practices. In this way, the user can anticipate the costs and/or impact of implementation of a particular treatment and control practice prior to its implementation in the "real world." The use of such "what-if" scenarios may help the user predict and manage bottlenecks, constraints, and risks associated with various vegetation control strategies and practices. A vegetation control treatment plan (or, simply, vegetation control plan), as the term is used herein, may be include a set of processes by which unwanted vegetation is identified and treated and all of the associated activities related to that process, such as the determination of treatment and control strategies as well as the application of treatments (e.g., chemical, biological, mechanical, etc.).

In some cases, a vegetation control plan may be designed to include the user's local knowledge or requirements. For example, a vegetation control plan may be designed to incorporate information which is only known at the local level such as the availability or unavailability of a resource, a user-designated preference, or a contractual or regulatory obligation such as legal requirements preventing the use or requiring the use of a specific treatment.

In one embodiment, a vegetation control plan may be broken down or divided into one or more plans that include instructions for executing a portion of the vegetation control plan. On some occasions, a plan may be customized for execution by a particular role or individual such as a manager, employee, group of employees, or supplier that assists a user in the execution of the vegetation control plan.

In one embodiment the vegetation control plan may include a logistics plan that provides options and instructions for the scheduling, movement, and use of equipment, supplies, and resources for the execution of the vegetation control plan.

Figure 1:
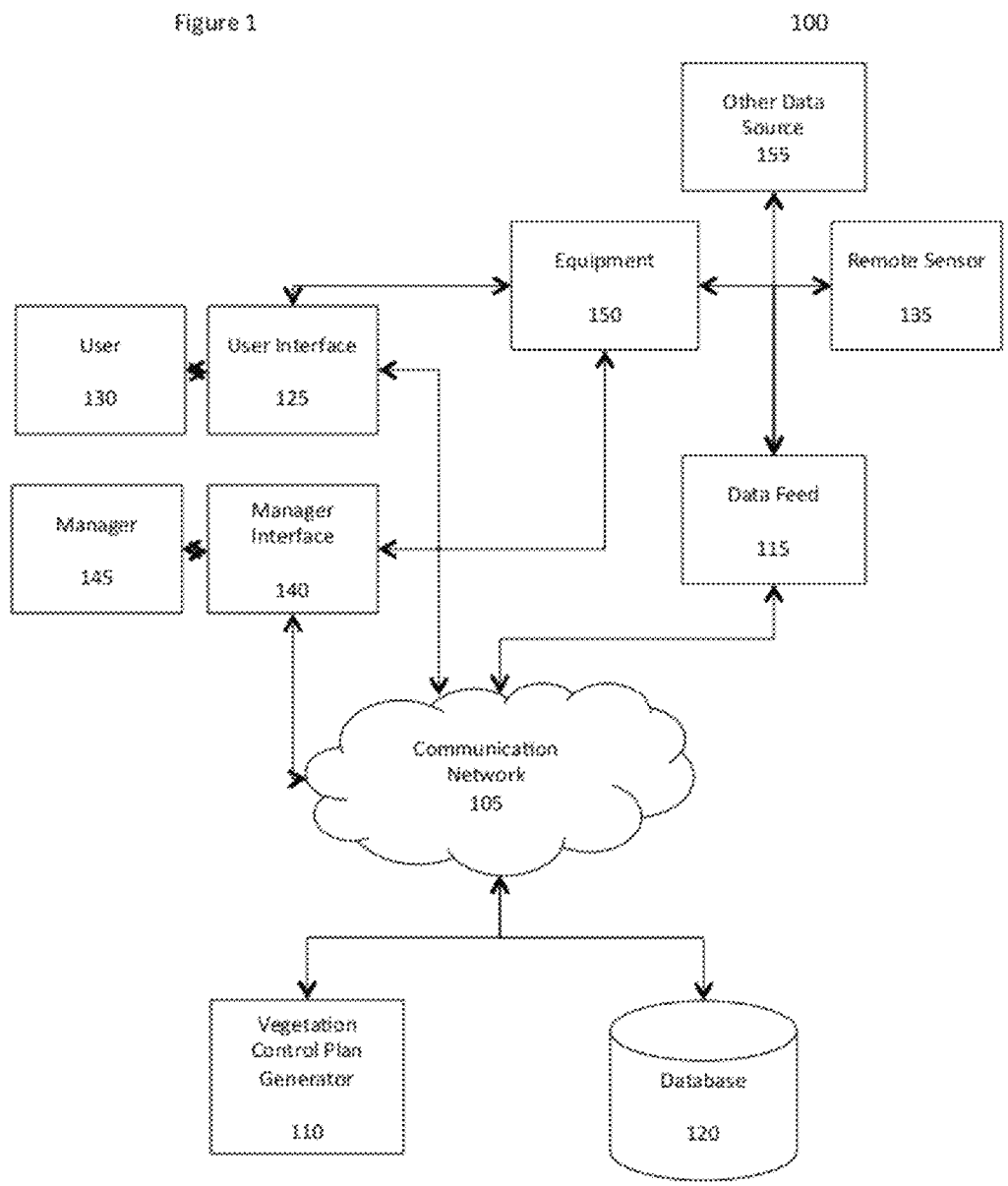
FIG. 1 is a block diagram illustrating an exemplary system having elements configured to design a vegetation control plan, in accordance with embodiments of the present invention.

Turning now to FIG. 1, a block diagram depicting an exemplary system 100 for executing one or more of the processes described herein is illustrated. System 100 includes a communication network 105, which communicatively couples a vegetation control plan generator 110, a data feed 115, a database 120, a user interface 125 (associated with a user 130), a remote sensor 135, a manager interface 140 (associated with a manager 145), one or more pieces of equipment 150 used to execute the plan, and other data source 155. Note, although only one network 105 is shown in the illustration, there may in fact be multiple such networks and internetworks involved and such networks and internetworks are being grouped together for purposes of simplifying the present discussion. Further, in some instances some of the components illustrated in FIG. 1 may be combined or may be absent from instantiations of the present invention. For example, once vegetation control plans have been generated and deployed, user 130 and/or manager 145 may download vegetation control plans to personal computers, tablet computers, smart phones, or other portable computer-based devices, in which case the vegetation control plan information may be self-contained and access to the communications network and other elements of system 100 may not be required until the vegetation control plan or information concerning vegetation control activities needs to be modified or updated. Although only one set of user/manager interfaces is shown, multiple such sets may exist, or a single manager interface may exist in a system which includes multiple user interfaces, and in some cases the manager interface may simply be a user interface which is configured to provide additional or other capabilities not typically associated with the user interface(s). Thus, system 100 in FIG. 1 is best regarded merely as an example of a system in which the present invention finds application.

As indicated, communication network 105 communicatively couples the other elements of system 100 to one another. Exemplary communication networks 105 include cloud computing networks, the Internet, local area networks (LAN), wireless local area networks (WLAN), and wide area networks (WAN). Usually, though not necessarily, user(s) 130 and/or manager(s) 145 may connect to system 100 periodically, either to upload vegetation control information (e.g., vegetation control plan modifications and additions, accomplishments, outcomes, or unplanned events), download new or updated vegetation control plans, review plan implementations, and so on. In some embodiments, multiple users 130 and/or managers 145 may be enabled to communicate with one another via communication network 105 in a manner similar to, for example, a social network and/or social networking information may be used to generate the vegetation control plan. In some embodiments, vegetation control plan generator 110, may reside on a computer-based platform, such as a server or set of servers. Such a server may be a physical server or a virtual machine executing on another hardware platform, however, the precise nature of such a configuration is not critical to the present invention.

Such a server, indeed all of the computer-based systems which are discussed herein, will be generally characterized by one or more processors and associated processing elements and storage devices communicatively interconnected to one another by one or more busses or other communication mechanism for communicating information. Storage within such devices will usually include a main memory, such as a random access memory (RAM) or other dynamic storage device, for storing information and instructions to be executed by the processor(s) and for storing temporary variables or other intermediate information during execution of instructions associated with the creation, updating, provision or other manipulation of vegetation control plans as described herein. Such a computer system will also include some form of read only memory (ROM) or other static storage device for storing static information and instructions for the processor(s). A storage device, such as a hard disk or solid state memory may also be included for storing information and instructions, such as the instructions to compute vegetation control plans as described herein. RAMs, ROMs, hard disks, solid state memories and the like are all examples of tangible computer-readable media, which may be used to store the instructions which comprise the methods for generating and presenting vegetation control plans in accordance with embodiments of the present invention. Execution of such instructions causes the various computer-based elements of system 100 to perform the processes described herein, although in some instances, hard-wired circuitry may be used in place of or in combination with such computer-readable instructions to implement the invention.

To facilitate user interaction, collection of information, and provision of results, the computer systems described herein will typically include some form of a display device, though such a display may not be included with the server, which typically communicates results to a client/manager station (via an associated client/manager interface) rather than presenting same locally. Client/manager stations will also typically include one or more input devices such as keyboards and/or mice (or similar input devices) for communicating information and command selections to the local station(s) and/or server(s).

To facilitate the network communications alluded to above, the various computer devices associated with system 100 typically include a communication interface that provides a two-way data communication path. For example, such communication interfaces may be Ethernet or other modems to provide a wired data communication connection or a wireless communication interface for communication via one or more wireless communication protocols. In any such implementation, the communication interface will send and receive electrical, electromagnetic, or optical signals which carry digital data streams representing various types of information. This facilitates the exchange of data, including vegetation control plans, through network(s) 105 as described herein.

Vegetation control plan generator 110 may be configured to generate a vegetation control plan by receiving input from user 130, data feed 115, manager 145, remote sensor 135, equipment 150, other data source 155, and/or accessing data stored in database 120. Data feed 115 may provide remotely gathered data relating to, for example, vegetation characteristics, weather, climate, geological data and events (e.g., thunderstorms, floods, etc.), cost of supplies, cost of resources, and satellite imaging data. Data feed 115 may be provided by, for example, various public (e.g., the U.S. Department of Agriculture or National Oceanic and Atmospheric Administration) or private sources and may be so provided on a fee-based or fee-free basis. On some occasions, a data feed may be associated with a system used by a supplier. On some occasions, data feed 115 may be provided by a social networking service (e.g., Twitter, Facebook). In this way, one or more users may communicate information between one another that may be relevant to a vegetation control plan.

Exemplary remote sensors 135 include drones, aircrafts, satellites, and/or physical sensors to measure, for example, moisture levels, rain fall, and site conditions for one or more sites included within a vegetation control plan. In some embodiments, remote sensors 135 may include remotely controlled drones, manned or unmanned aircrafts, or vehicles that remotely sense or gather vegetation control information, such as the impacted area's condition, size of the area, the stage of plant development and/or information concerning the larger area in proximity to the targeted site.

Database 120 may be one or a series of databases linked together and in communication with vegetation control plan generator 110. Database 120 may store data related to any facet of the vegetation control process including, for example, plant identification and characteristics (e.g., growth characteristics, existing research, etc.), budget information, site location including size and shape, soil characteristics, resource availability or utilization, unplanned events (e.g., weather, equipment breakdowns, illness, and other personnel issues, etc.), local knowledge (e.g., user preferences, user contractual obligations, and historical outcomes, etc.), regulatory requirements, and planned vegetation control events (e.g., personnel availability and scheduled treatment applications, etc.). Further details regarding the information stored in database 120 are discussed below with regard to FIG. 2.

Generating a vegetation control plan can involve the user 130 manually selecting or entering, for example, various preferences (e.g., starting date, targeted end date, starting locations, etc.), contractual obligations, legal, and other regulatory requirements, crop considerations for an existing or planned crop on the site, land data (e.g., visually determined conditions, features, site/field entry points, etc.), equipment type and conditions, transportation and relocation considerations (e.g., weight constraints, etc.), employee considerations, and/or local knowledge of vegetation that may be incorporated into a vegetation control plan. On some occasions, manually selected preferences and other user-entered information may be stored in database 120.

In some embodiments, a user may enter local knowledge (e.g., preferences) or requirements into vegetation control plan generator 110 for incorporation into a vegetation control plan. For example, a user may enter a period of time in which a particular resource is available or details of a required supply including its delivery and site/field entry points which may be incorporated into the vegetation control plan by vegetation control plan generator 110. Alternatively, vegetation control plans may be generated in a partially or wholly automated manner by vegetation control plan generator 110 analyzing, for example, historical, real-time, or known data relating to vegetation control. For example, vegetation control plan generator 110 may automatically include consideration of historically known climate conditions (e.g., average temperature or rainfall, etc.) for a geographic location when generating a vegetation control plan. Of course, many other forms of vegetation control plans can be generated, and such plans may include any type of data related to vegetation control.

Once the vegetation control plan is generated, vegetation control plan generator 110 provides information about the vegetation control plan to user 130. This may be done in a variety of ways, including through the use of an e-mail and/or a message relayed via a messaging system accessible through communication network 105 that includes hyperlinks to a portal at which details regarding the vegetation control plan are available. Other forms of communication, such as an instant message or a text message sent via short message service (SMS) to a user's or operator's mobile phone, or an automated phone call placed by the vegetation control plan generator 110, may also be used to, for example, indicate a vegetation control plan has been updated or an unplanned event has occurred. In FIG. 1, user interface 125 is meant to represent any device via which user 130 can be provided with information regarding the vegetation control plan. Exemplary interfaces 125 include computer systems, equipment interfaces as may be provided by, for example, a tractor, sprayer, aircraft and/or other equipment, mobile computing devices (including but not limited to so-called "smart phones"), televisions, tablet computing devices, and portable computing devices.

In some embodiments, one or more managers 145 may be enabled to access a vegetation control plan via manager interface 140 communicatively coupled to network 105. Manager interface 140 may be similar to user interface 125 and, on some occasions, may be resident on a piece of equipment 150 used to execute the treatment. Managers 145 may manage and monitor the activities of any number of employees and/or pieces of equipment and the deployment of resources in the execution of a vegetation control plan. Exemplary managers 145 include employees, managers, owners, equipment operators, suppliers, consultants, regulators, and others who assist user 130 in the determining, updating, and/or executing a vegetation control plan.

Vegetation control plan generator 110 may use historical vegetation control information in order to, for example, determine the stage of plant development for the unwanted vegetation, determine a period or number of growing degree days required for the unwanted vegetation to mature, and/or determine the point at which the treatment plan is the least risky (lesser opportunity of producing unintended results) and would best produce the desired and intended outcomes. These determinations may be used to create the vegetation control plan, including making product recommendations as well as predictions for outcomes.

In some embodiments, one or more pieces of equipment 150 will serve multiple functions, including for example, as an input device for the user 130 or the manager 145 to request generation and/or modification of plans, as an output device for the system to control the activity of the equipment according to the vegetation control plan generator's 110 instructions, for example controlling application rates and steering or flying the equipment, and as a status device reporting progress, activities, and outcomes.

Generating vegetation control plans may include modifying previously selected or recommended plans. For example, the vegetation control plan generator may be configured to update or modify a selected vegetation control plan according and responsive to information concerning other vegetation control projects, weather, new product data, new research data, new best practices information, unplanned events, and new regulatory information. Examples of such instances are described further below.

Figure 2:
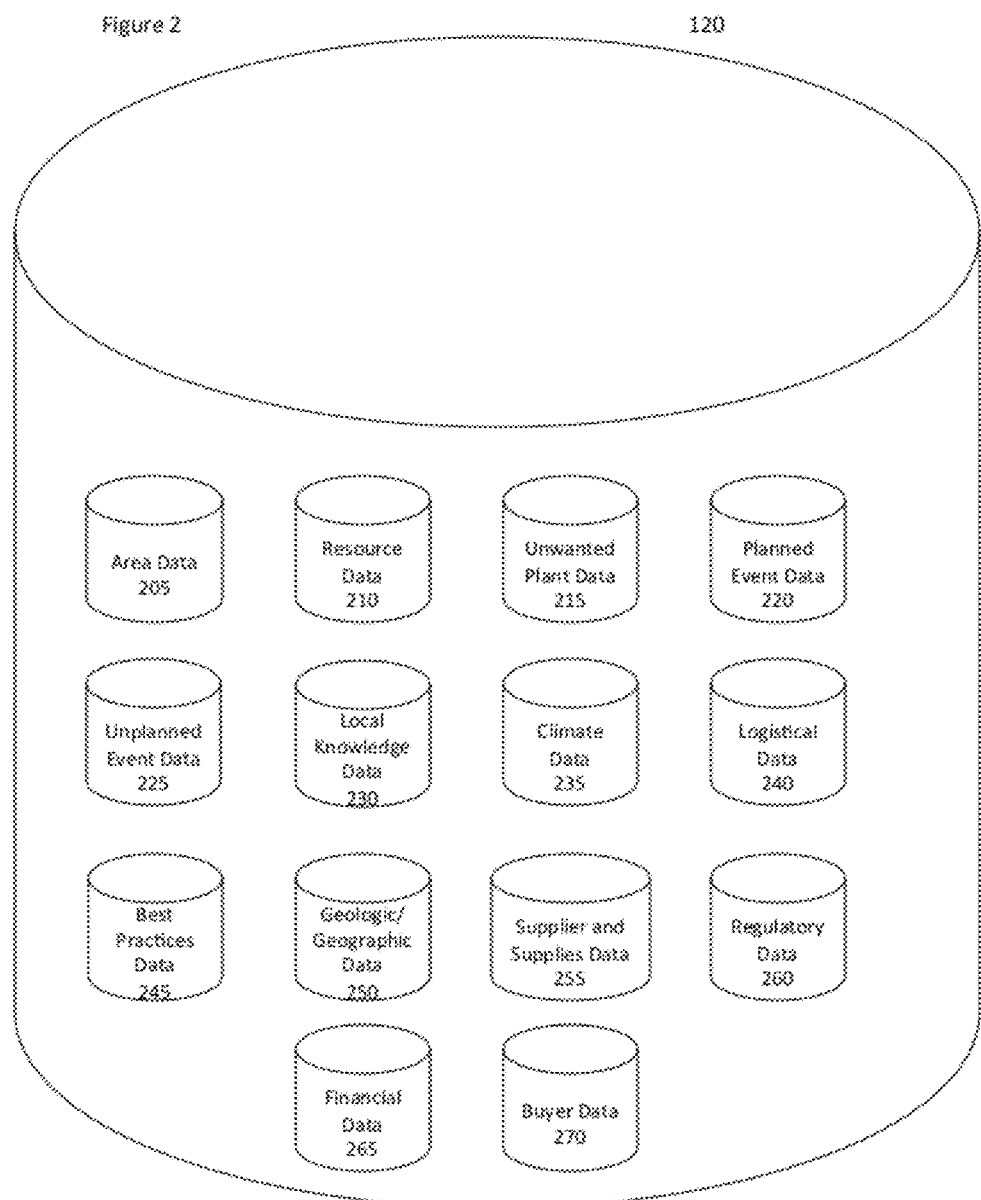
FIG. 2 is a block diagram illustrating exemplary vegetation control data, in accordance with embodiments of the present invention.

FIG. 2 is a block diagram depicting exemplary sets of data or databases that may be included in database 120. For example, database 120 may include area data 205, resource data 210, unwanted plant data 215, planned events data 220, unplanned events data 225, local knowledge data 230, climate data 235, logistical data 240, best practices data 245, geologic/geographic data 250, supplier and supplies data 255, regulatory data 260, financial data 265, and/or buyer data 270. Information stored in database 120 may be received from, for example, a user, such as user 130, a data feed, such as data feed 115, a manager, such as manager 145, a piece of equipment, such as equipment 150, a remote sensor, such as remote sensor 135 via a communication network, such as communication network 105, and/or combinations of the foregoing.

Area data 205 may include information regarding, for example, target site locations, the shape of the site, the proximity of the target site to other relevant locations, and the target area's characteristics, such as topographical information, soil type, other vegetation on the site, organic matter, moisture capacity, and fertility. In addition, area data 205 may include historical experiences of vegetation control projects, observations, and outcomes.

Resource data 210 may include information regarding, for example, resources available for treating unwanted vegetation. Exemplary resource data may include equipment data (capacities, costs, fuel consumption), personnel data (skills, availability, wages and benefits), and vehicle data (capacities, costs, fuel consumption).

Unwanted plant data 215 may include information regarding plant characteristics, including, but not limited to, growing degree day requirements, water requirements, nutrient requirements, date, time, and other data related to the germination and development of the unwanted vegetation, and disease, chemical, pest, or weather vulnerabilities for that type of unwanted vegetation.

Planned event data 220 may include information regarding planned events preceding, during and/or following completion of a vegetation control plan. Exemplary planned events may relate to activities such as scouting events, scheduled aerial data gathering events, treatment events, and field preparation events. Other planned events relate to planned downtime for equipment, planned time-off for personnel, and other events that can be anticipated and planned for.

Unplanned events data 225 may include information relating to unplanned or dynamically changing events that may affect the vegetation control plan, such as weather or geologic events, equipment breakdowns or unavailability, as well as the unplanned addition of supplementary tools and equipment, unplanned cost changes, personnel issues, supplier issues, and changing availability of supplies. Other unplanned events are events that cannot be anticipated at the time of the creation of the vegetation control plan and occur during the execution of the vegetation control plan and impact outcomes and activities.

Local knowledge data 230 may include information relating to knowledge or preferences specific to a user and may include, for example, preferred practices, preferred starting point and vegetation control sequences, preferred scheduling, site-specific knowledge, and past experience. On some occasions, local knowledge data 230 may be used to override or modify an aspect of a vegetation control plan in a manner similar to application of a rule to the vegetation control plan generation process. On some occasions, local knowledge data 230 may include data received via a social network. Alternatively or in addition, such data may include contractual requirements, special supplier instructions, special buyer requirements for an impacted crop, or special landlord requirements, for example, the unwanted vegetation must be treated organically and all treatments must be completed before a specific date.

Climate data 235 may include information relating to weather and/or climate for a particular region, area, or site.

Logistical data 240 may include information relating to the logistics of executing a vegetation control plan, such as movement of people, equipment, and supplies to and from the treatment area, including routes, schedules, and special instructions.

Best practices data 245 may include information relating to known or determined best practices for treating an unwanted plant species and/or other vegetation control issues. Best practices data may be determined from analysis of, for example, local vegetation control processes, vegetation control plans, actual vegetation control outcomes, recommendations of and/or restrictions imposed by, for example, governmental agencies or distributors of supplies or equipment and/or a comparison of expected vegetation control results and actual vegetation control outcomes. On some occasions, best practices data 245 may include data received via a social network or culled from one or more Internet-based sources (e.g., blogs, forums, and the like).

Geographic/geologic data 250 may include geographic and/or geologic data related to, for example, the areas upon which the unwanted vegetation is growing, and roads to move supplies, equipment, and people. Exemplary geographic or geologic data may include roadway, surface and/or underground water, and landmark locations. Geographic/geologic data 250 may be derived from a variety of sources, such as satellite images, global positioning information, historical information regarding an area of land, plat book service providers, non-governmental organizations, and public and private organizations and agencies.

Supplier and supplies data 255 may include supplies data (stock keeping units (SKUs), as well as their capabilities and usage specifications, quantities, locations, prices, etc.) and supplier data (names, locations, services, contractual information, etc.), as well as delivery and/or application instructions, dates and terms for products used in connection with vegetation control plans.

Regulatory data 260 may include data that relates to site-specific regulations regarding the use of specific products, rates, practices, permits, reporting, or other regulatory requirements.

Financial data 265 may include data that relates to the costs of particular treatment and the costs of delaying the vegetation control plan.

Buyer data 270 may include data that relates to requirements and specifications that a buyer of an agricultural crop may have that impact the vegetation control plan, such as, for example, a restriction on a particular control treatment activity, scheduling an event and/or crop requirement standards.

Figure 3:
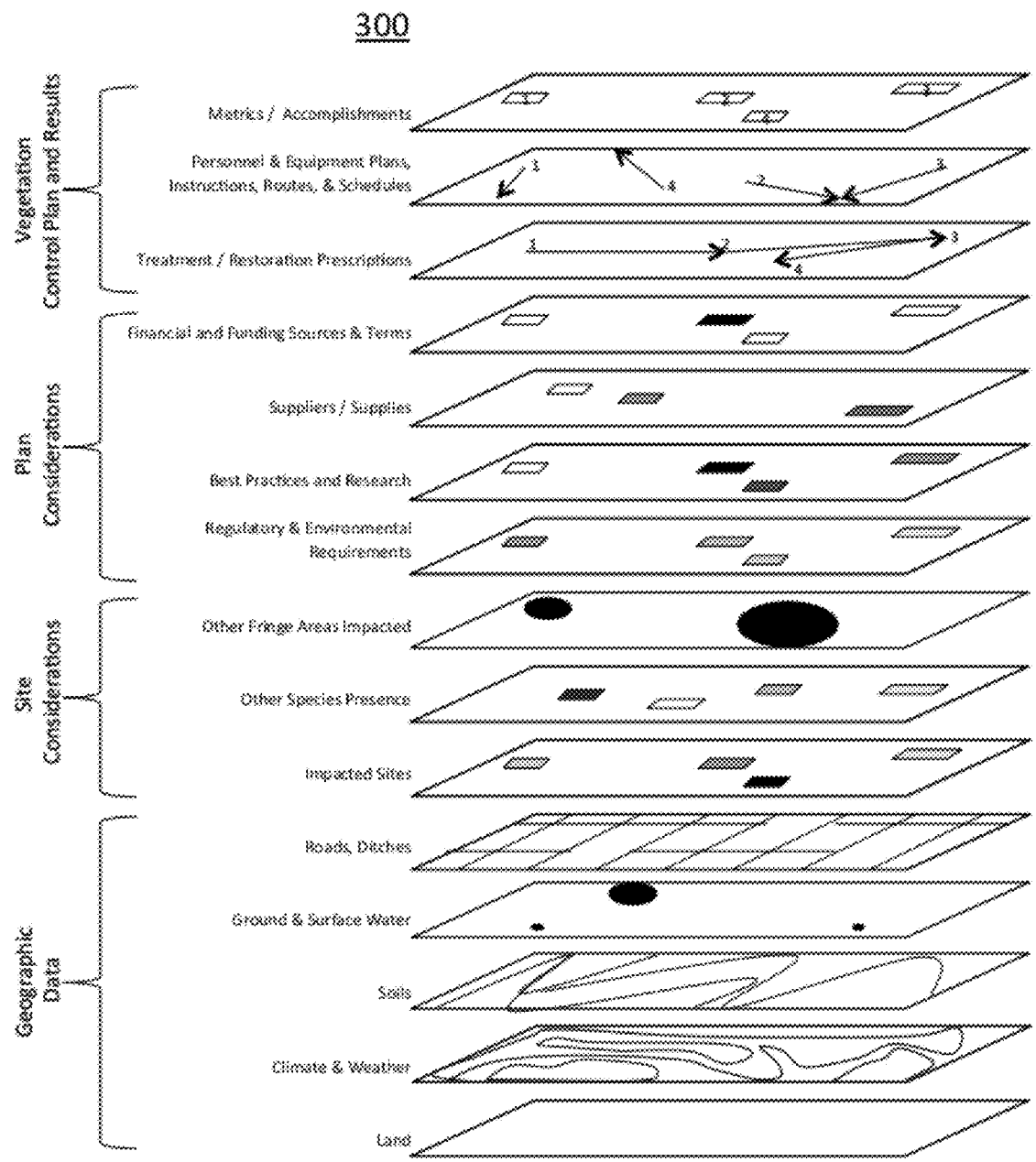
FIG. 3 depicts an exemplary diagram of layered geographic and/or geologic data for an area of land, in accordance with embodiments of the present invention.

On some occasions, the geographic and/or geologic data 250 may be part of a geographic information system (GIS), an example of which is illustrated in FIG. 3. As shown, a GIS 300 includes various data structures, each of which may be regarded as a layer. These layers provide information regarding various data elements of a vegetation control plan, including, for example, geographic data, site data, historical data, and treatment application data. Exemplary geographic data may include, for example, information related to an area of land (the target site plus adjacent areas) (e.g., size, location, etc.), historical weather and climate information, soil attributes (e.g., soil types, texture, organic matter, fertility, pH levels, etc.), presence and location of ground and surface water, and any man-made features upon the land (e.g., buildings, roads, ditches, etc.). Exemplary site considerations may include the location of the impacted sites for the vegetation control plan (e.g., size, shape, location, etc.), the presence and location of other vegetation/crops in the area, and the characteristics and conditions of adjacent areas to the impacted sites. Exemplary plan considerations may include information related to area regulatory and environmental requirements, known best practices and research, supplier and supplies data, and financial requirements. Exemplary vegetation control plans and results may include treatment prescriptions, such as information related to chemical, mechanical, and/or biological products to be used on the impacted site, and any other treatments that are recommended. This data may include, for example, information related to employee activities (e.g., employee availability and/or expertise, instructions, transportation routes, and treatment schedules) and equipment and/or resource information (e.g., availability, capacity, instructions, transportation routes, and/or schedules). Likewise, this data may include metrics, accomplishments, and the best practices determined from the vegetation control plan.

Figure 4A:
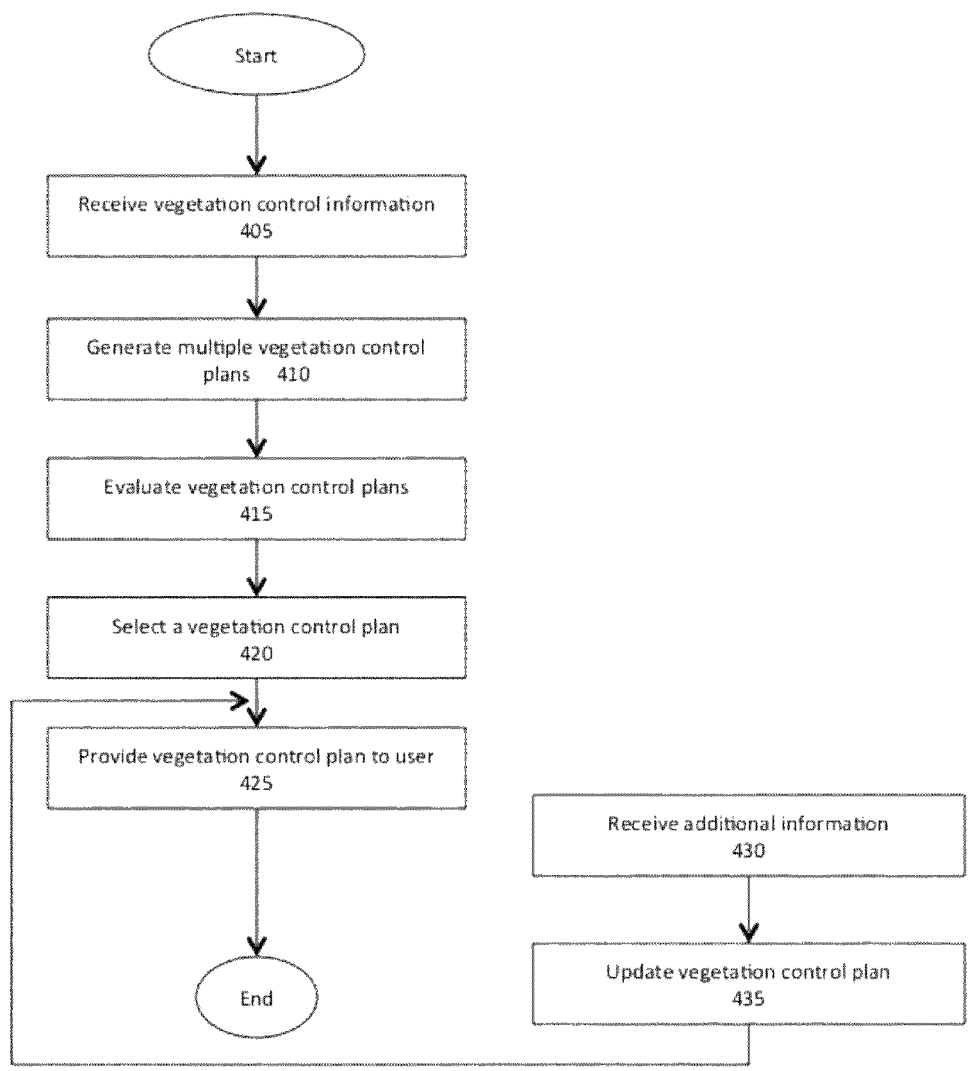
FIGS. 4A and 4B illustrate exemplary processes for generating a vegetation control plan, in accordance with embodiments of the present invention.

FIG. 4A is a flow chart depicting an exemplary process 400 for generating a vegetation control plan in accordance with an embodiment of the present invention. Process 400 may be executed by the vegetation control plan generator described in connection with FIG. 1 in cooperation with, for example, any of the systems and/or system components disclosed herein.

Figure 6:
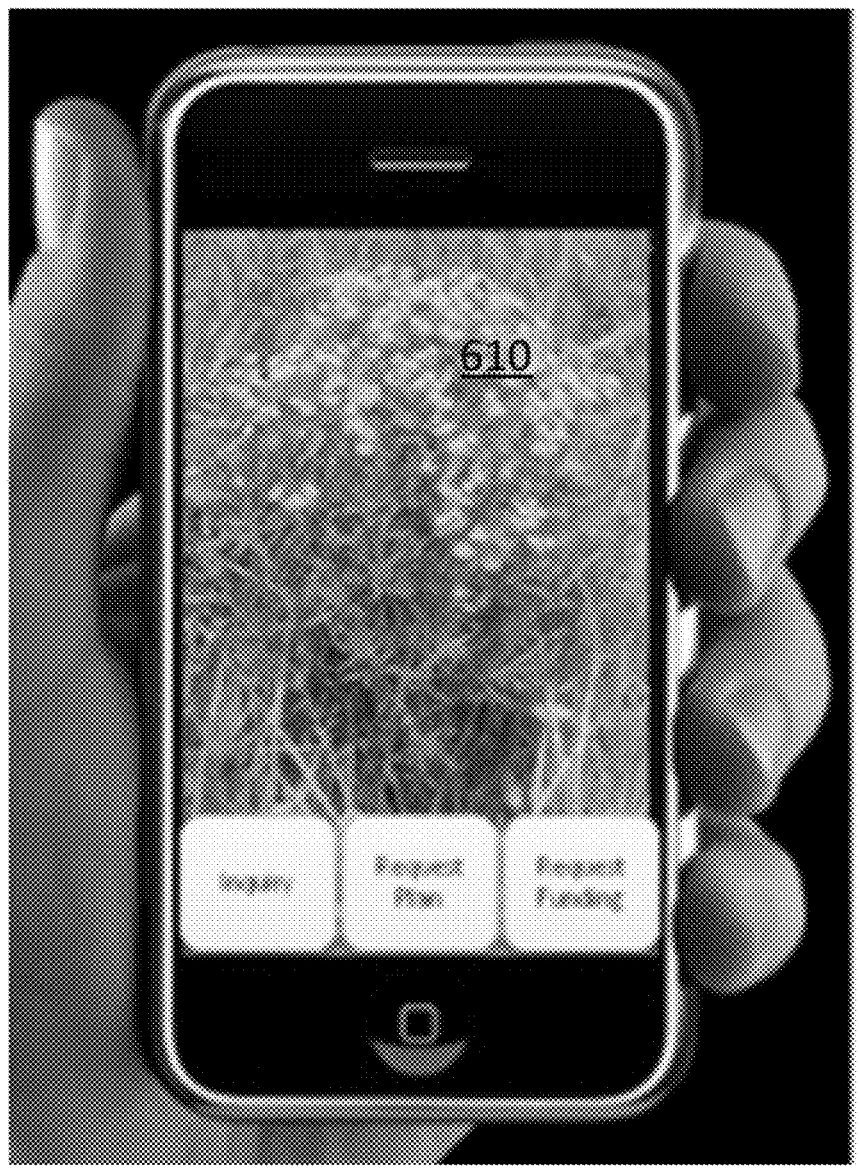
FIGS. 6-11 illustrate various exemplary graphical user interface (GUI) screens that may be used to receive data concerning and to provide a vegetation control plan from/to a user who is managing a vegetation control project, in accordance with embodiments of the present invention; and Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

In step 405, information regarding vegetation control may be received by, for example, a vegetation control plan generator, such as vegetation control plan generator 110 from, for example, a user, such as user 130, a database, such as database 120, a data feed, such as data feed 115, a manager, such as manager 145, equipment, such as equipment 150, another data source, such as other data source 155, and/or a remote sensor, such as remote sensor 135 via a communication network, such as communication network 105 and/or an interface, such as interfaces 125 or 140. Exemplary received information may relate to impacted areas or resources for the vegetation control plan, unwanted plant species characteristics, planned events, unplanned events, local knowledge, weather or climate, logistics, vegetation control best practices, human resources considerations, and/or geologic/geographic characteristics of impacted areas. On some occasions, the received information may include one or more previously generated vegetation control plans and/or a best practice associated with an aspect of the vegetation control plan. In some embodiments, a user may provide information regarding vegetation control to the vegetation control generator via a GUI, an example of which is depicted in FIG. 6.

One or more vegetation control plans may then be generated based upon the received information (step 410). When two or more vegetation control plans are generated, each of the vegetation control plans may be evaluated according to one or more criterion (step 415). Exemplary criterion include overall plan efficiency, utilization of resources, financial and/or temporal costs, risks, the suitability of a treatment practice to a particular site, regulatory requirements, and logistical considerations, including potential bottlenecks and constraints. Then, in step 420, a vegetation control plan may be selected based upon the evaluation and provided to the user via, for example, a communication network (step 425). On some occasions, one or more of the generated vegetation control plans may be provided to the user and, in some instances, the user may select one or more of the vegetation control plans.

In some embodiments, additional information may be received (step 430) following step 425, after the original vegetation control plan has been provided to the user and, as a result, the vegetation control plan may be updated to incorporate the additional information (step 435). For example, in step 430, information regarding a weather event, equipment breakdown, unavailable personnel, supplier or supplies issue, or other conditions may be received and, in step 435, the vegetation control plan may be updated accordingly. The updated plan may then be provided to the user.

Figure 4B:
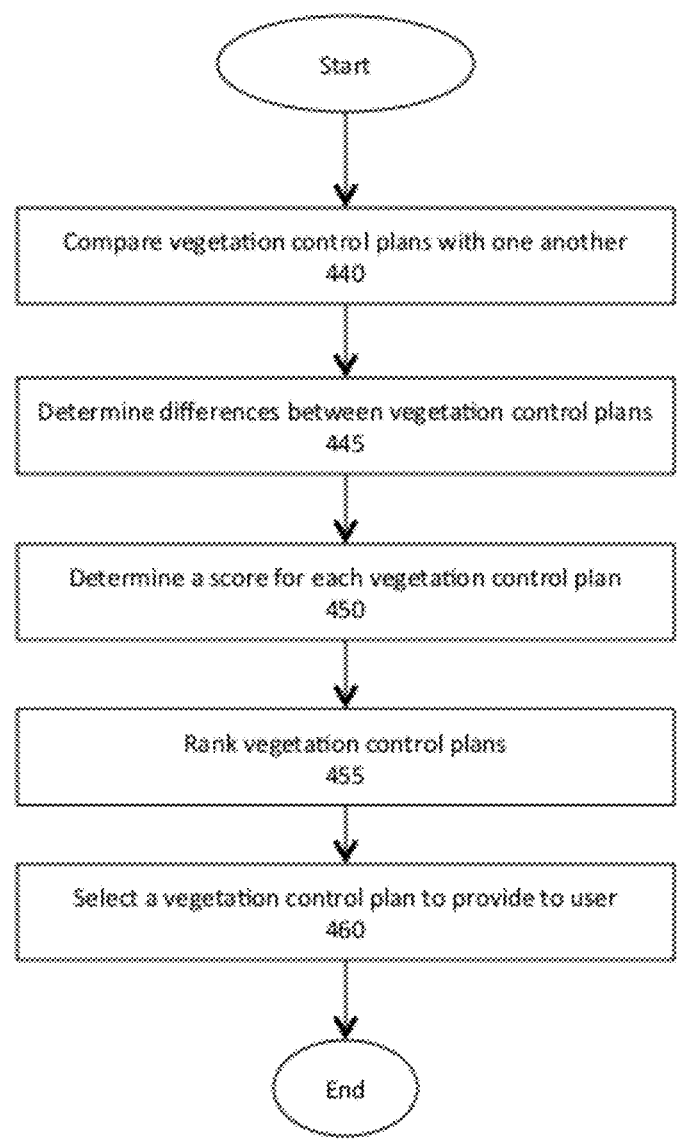

FIG. 4B is a flow chart depicting an exemplary process 401 for evaluating a vegetation control plan as described above with regard to step 415. Process 401 may be executed by the vegetation control plan generator described in connection with FIG. 1 in cooperation with, for example, any of the systems and/or system components disclosed herein.

In step 440, multiple vegetation control plans may be compared with one another and/or compared to benchmarks. In some embodiments, this comparison may include a comparison of corresponding attributes of the two or more vegetation control plans. Differences between the vegetation control plans and/or attributes included therein may then be determined based on the comparison (step 445) and a score for each vegetation control plan may be calculated (step 450). The score may be determined based on costs, times, treatment effectiveness and/or efficiencies, complexity/simplicity of the plan, potential environmental impacts, risks, warranties, level of coordination with other vegetation control plans, and other plan variables that can be scored. The scores may be determined by comparing the plan to other plans, a defined benchmark, the plan's objectives, or best practices. In some cases, the score may be an overall score for a vegetation control plan, while in other cases sub-scores related to a particular criterion or group of criterions may be determined. The vegetation control plans may then be ranked according to their overall score and/or sub-scores (step 455). One or more vegetation control plans may then be selected for presentation to a user based upon their relative scores or sub-scores (step 460). Following step 460, process 401 may end. As indicated above, in some instances a selected vegetation control plan may be updated as one or more of climate data, historical weather data, current weather data, predicted weather data, new product data, new research data, new best practices, and/or new regulatory data is received.

Figure 5:
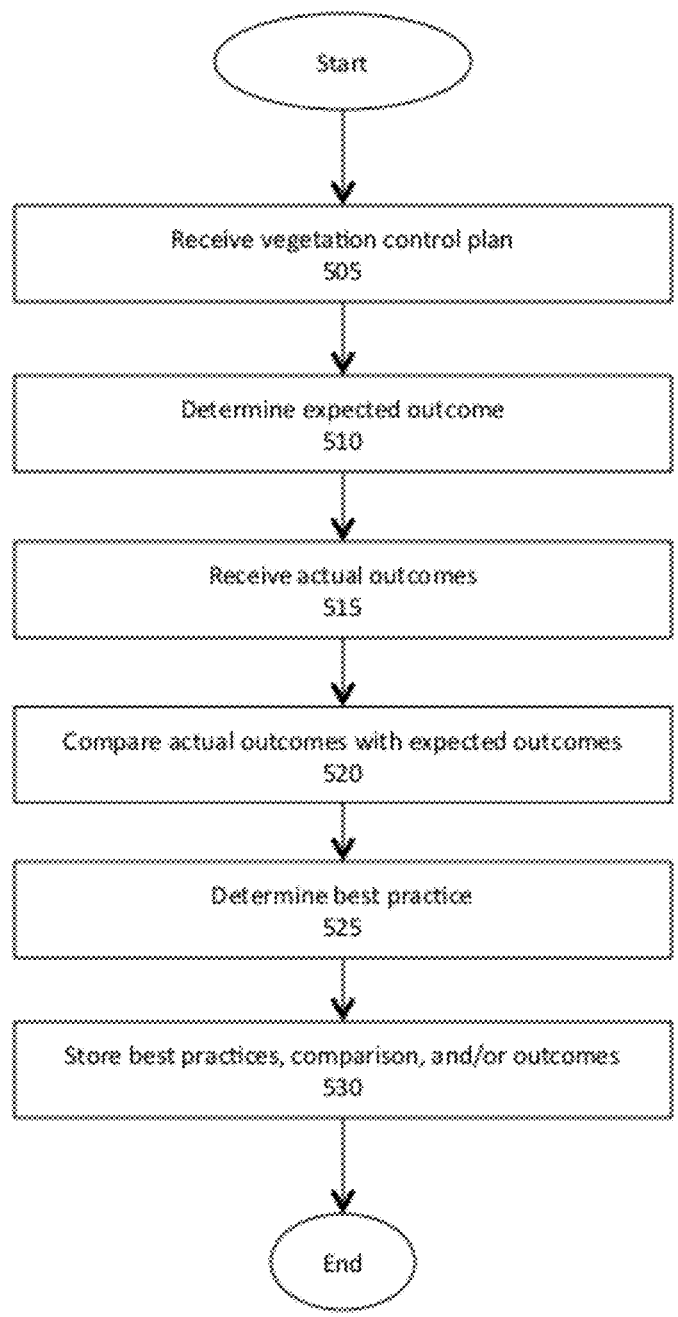
FIG. 5 illustrates an exemplary process for determining a best practice for treating and controlling unwanted vegetation, in accordance with embodiments of the present invention.

FIG. 5 is a flow chart depicting an exemplary process 500 for determining a best practice for vegetation management treatment. Process 500 may be executed by the vegetation control plan generator described in connection with FIG. 1 in cooperation with, for example, any of the systems and/or system components disclosed herein.

In step 505, a vegetation control plan may be received (e.g., retrieved from database 120) and expected results or outcomes for the vegetation control plan may be forecast (step 510). In step 515, information regarding the executed vegetation control plan, such as costs and efficiencies may be received and compared with the forecasted results and outcomes for the vegetation control plan (step 520). A best practice (e.g., one where the expected costs of implementation are minimized while at the same time the expected effectiveness of the plan are maximized) may be determined based upon the comparison (step 525) and results of the comparison and/or the determined best practice may be stored in, for example, database 120 (step 530). Plan effectiveness may be evaluated based on the expected degree of eradication of unwanted vegetation, minimal impact to desired vegetation, and/or other criteria. Following step 530, process 500 may end.

FIGS. 6-11 illustrate various aspects of graphical user interface (GUI) screens that may be used to gather and/or present information regarding vegetation control in connection with the generation and provision of a vegetation control plan in accordance with embodiments of the present invention. The GUIs shown in FIGS. 6-11 may be prepared by, for example, vegetation control plan generator 110 and provided to a user, such as user 130 via an interface, such as user interface 125. FIGS. 6-11 illustrate exemplary GUIs that relate to a user who is planning and managing one vegetation control project, and demonstrate the use of a "smart phone" and email correspondence as a user interface 125.

FIG. 6 shows examples of manners in which the user may provide information regarding vegetation control to the vegetation control generator via a GUI. Image 610 shows a user taking a photo of unwanted vegetation with his or her "smart phone", which can be considered to be an exemplary user interface 125. The photo can also be taken using a camera or other digital device 125 that is able to present data to the vegetation control plan generator 110. In this example, the user transmits the image, along with other relevant data, such as the size and/or location of the infested area, via the communication network 105 to the vegetation control plan generator 110. The vegetation control plan generator 110 may use image recognition or identification techniques along with other information (such as unwanted plant data 215 from the database 120) to identify the plant species, or to provide a short list of possible species options to the user from which the user may select the correct plant via the user interface 125. Location information may be provided by location services routinely included in the "smart phone" (e.g., which may determine location on the basis of a global positioning system or other satellite-based navigation system, and/or cellular service location information) and may be used by the vegetation control plan generator 110 to access geographic/geologic data 250 (e.g., from a GIS included in the database). Such information may assist the vegetation control plan generator 110 in identifying the species of plant depicted in the image and/or may identify the location and possibly the boundaries/shape of the site of the infestation. The vegetation control plan generator can use the data in the database 120 along with the provided location to determine the area data 205, including soils, slope, and surface and ground water, climate data 235, logistical data 250, and other site-specific information. All of this information is provided to the vegetation control plan generator 110 via the user or manager interfaces 125 and 140 and the communication network 105.

Alternatively, the unwanted vegetation and/or site location (including its size and shape) may be determined through the use of a drone or unmanned aircraft 620 which would image the unwanted vegetation from the air and determine the location of same using its onboard navigation and camera sensors. Similar imaging and location determination could be performed by ground-based vehicles. Other examples of techniques to identify and locate unwanted vegetation may be through visual inspection, manned aircraft or marine vehicles (e.g., in the case of unwanted vegetation in lakes, rivers, reservoirs, etc.), and/or satellites.

Figure 7:
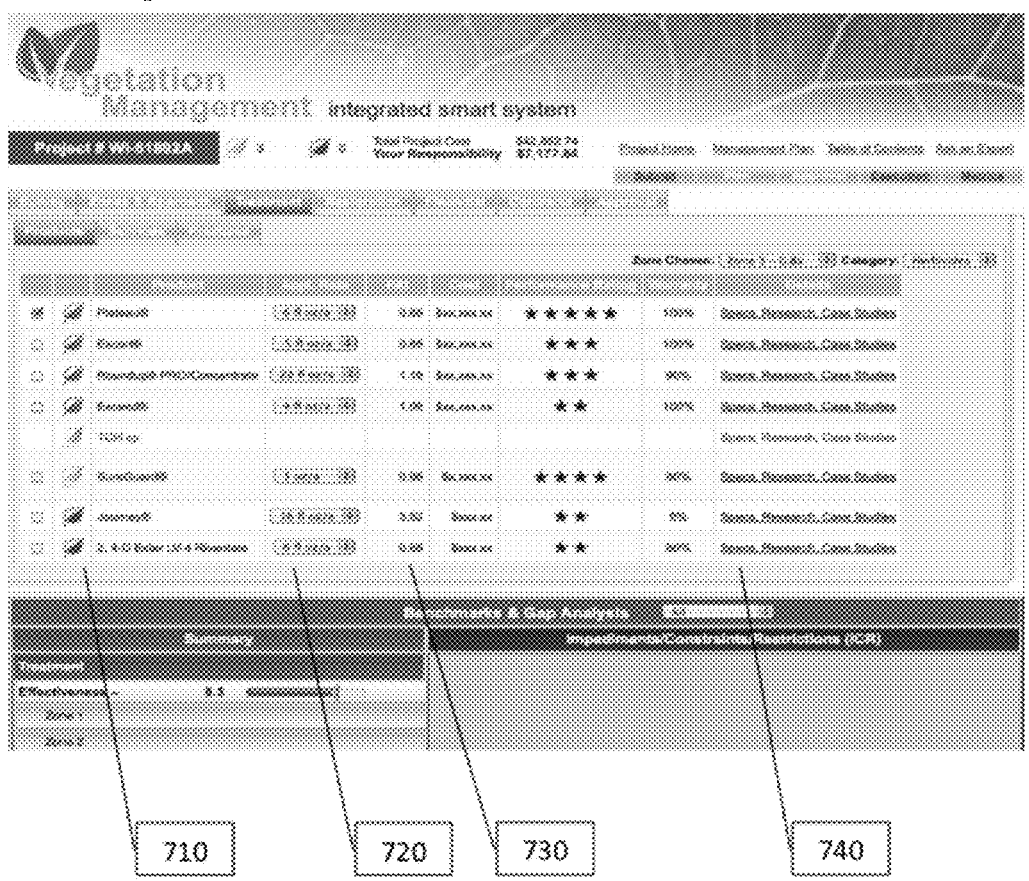

FIG. 7 is an exemplary screen 700, which presents information concerning possible supplies (treatment products) to be used in connection with a treatment plan and allows for various user selections thereof. In this example, for this specific treatment zone, a chemical approach is recommended by the vegetation control plan generator and accordingly, the vegetation management plan generator 110 provides a list of product options that are available to the manager from which to choose. In some situations several products work comparably well and the manager may want to select an alternate one. In this embodiment the manager can override the recommendation of the vegetation control plan generator and make a selection based on his or her preference or local knowledge. To assist the manager in making the best selection possible and to prevent errors that have unintended consequences, the product options may be categorized using a rating color 710, such as green—recommended, yellow—marginally acceptable, red—not recommended, gray—unsuitable or unlawful. This exemplary screen 700 also provides specific details about each product, including the recommended application rates 720 based on the site characteristics including the soil type among other factors, the pounds of active ingredients (PAI), the costs for each product 730, the effectiveness score, the warranty, and links to any available product specifications, research, or case studies 740. The vegetation management plan generator 110 recommends treatment products based on information in its database 120, such as unwanted plant data 215, climate data 235, area data 205, resource data 210, local knowledge data 230, logistical data 240, best practices 245, geologic/geographic data 250, suppliers data 255, regulatory data 260, financial data 265, and buyer data 270.

Figure 8:

FIG. 8 illustrates an exemplary screen 800 where the user has been granted additional control over the products selected. In this embodiment, the user is allowed to exercise local knowledge to make a selection and the system proactively identifies the potential impacts of that decision. Exemplary screen 800 presents the results of selecting a product that has been rated as not recommended for this particular vegetation problem, color coded as red. The lower portion of the screen provides the reasons that the product was not recommended. In this example, those reasons include the potential for water table contamination and surface water contamination. Although these warnings are provided, the user can override the vegetation control plan generator 110 if he or she desires and select the product that is not recommended through the user or manager interface 125 and 140. In some embodiments the user is not allow to select a non-recommended product (either at all, or in some cases absent manager approval). For example, lock-out controls imposed by vegetation control plan generator 110 may make the selection of non-recommended products impossible.

Figure 9:
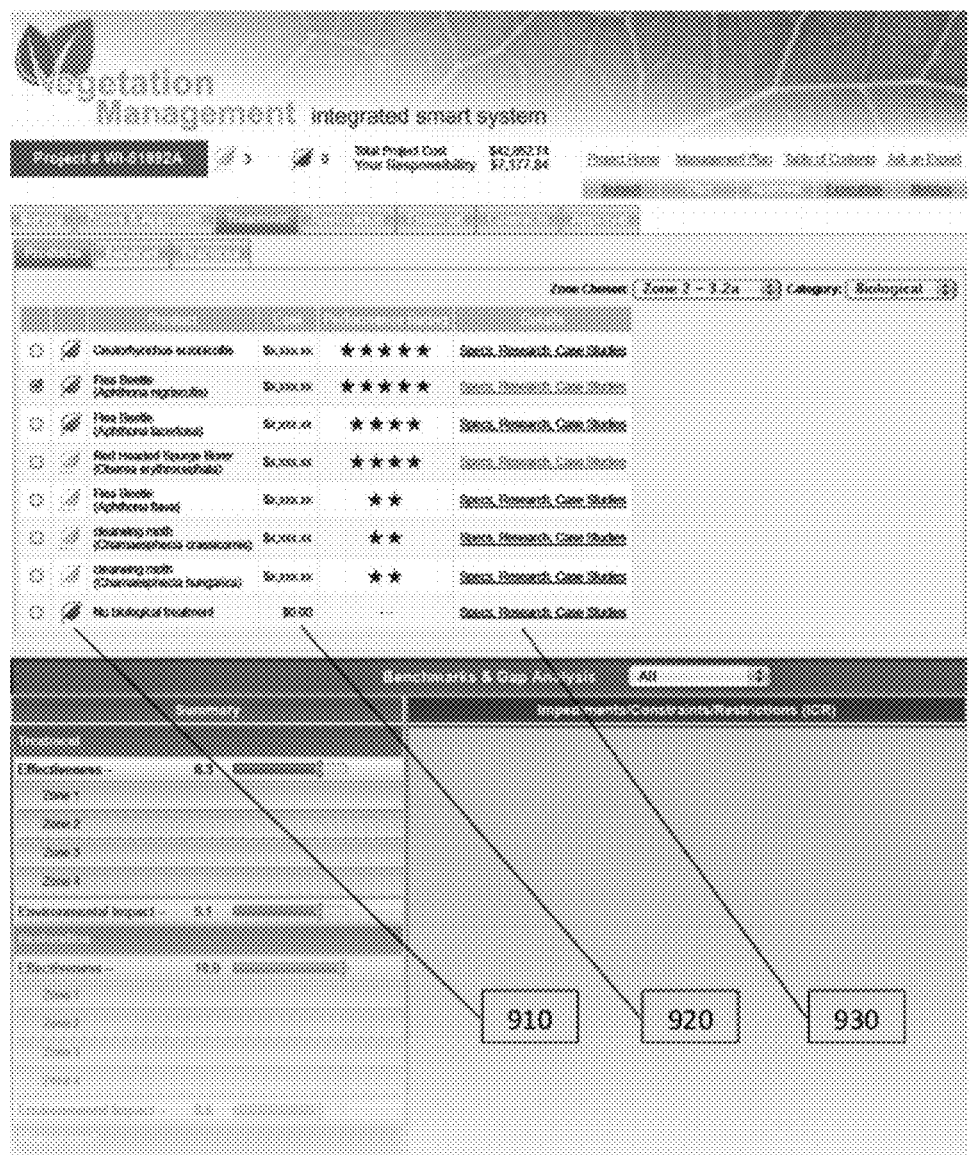

FIG. 9 illustrates an exemplary screen 900, a biological alternatives product selection page. In this example and within this specific treatment zone, a biological approach (use of insects, etc.) is selected and the vegetation control plan generator 110 provides a list of options/alternative products that are available for the user. The options are given one of four colors as a rating 910, such as green—recommended, yellow—marginally acceptable, red—not recommended, gray—unsuitable or unlawful. This screen 900 also provides specific details about each product, the costs for each product 920, the effectiveness score, and links to any available product specifications, research, or case studies 930. The vegetation control plan generator 110 recommends treatment products based on information in its database 120, such as unwanted plant data 215, climate data 235, area data 205, resource data 210, local knowledge data 230, logistical data 240, best practices 245, geologic/geographic data 250, suppliers data 255, regulatory data 260, financial data 265, and buyer data 270.

Figure 10:
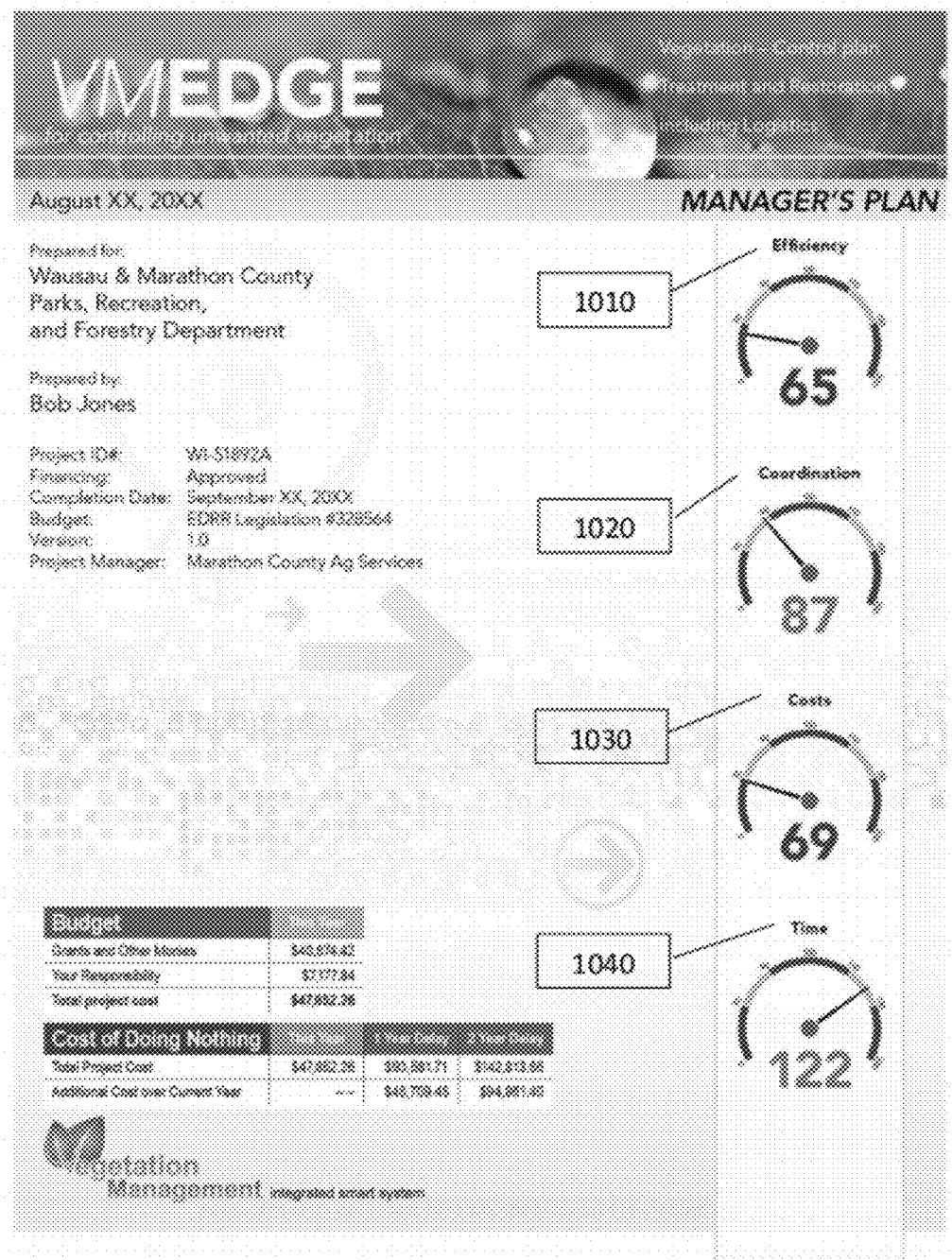

FIG. 10 illustrates an example of a printed plan report 1000, i.e., the cover page thereof, which includes a summary of information regarding a current vegetation control plan. In this example, an efficiency index 1010, an environment index 1020, a costs index 1030, and a time index 1040 are provided. These indices may indicate a numerical value or score for the actual, estimated, and/or projected performance of a vegetation control plan when executed as compared to a benchmark. The indices can also be used to compare two or more vegetation control plans. In the example provided, indices 1010-1040 are structured and calibrated to calculate a score between 0-200. The greater the deviation from the benchmark the further the score diverges from a target score of 100. Of course, any method of measurement or presenting measurement results can be used to generate or provide results from these comparisons.

Efficiency index 1010 may provide a score indicating how effectively and efficiently the resources available to the user are utilized in the vegetation control plan as compared to their capacities. A score between 0 and 99 may indicate that resources are being, or will be, used below their capacity. A score between 101 and 200 may indicate that too few resources are being or will be used to execute the vegetation control plan, resulting in resources that are used in excess of their capabilities.

Effectiveness index 1020 may provide a score indicating the level of effectiveness the plan is expected to achieve. This may be determined by comparing a plan's anticipated or realized outcomes against known best practices. A score between 0 and 99 may indicate that the plan's effectiveness is below benchmark objectives; for example, lowered effectiveness may be a result of using a treatment practice that is not recommended. A score between 101 and 200 may indicate that the effectiveness is excessive and the plan may be too aggressive.

Costs index 1030 may provide a score indicating cost effectiveness of a vegetation control plan. A score between 0 and 99 may indicate that the cost of implementing the plan is, or will be, less than known best practices for targeted costs while a score between 101 and 200 may indicate the opposite.

Time index 1040 may provide a score indicating a comparison of the elapsed time required to start and complete a vegetation control plan as compared to best practices, a benchmark, or a targeted time period. A score between 0 and 99 may indicate that the time planned or actually required to complete the plan is, or will be, less that the known best practices targets. A score between 101 and 200 may indicate that steps can be taken to reduce the total time required to implement the plan and realize a more preferred score.

Report 1000 is one example of the kind of print materials associated with a plan which are made available through the use of the present methods and systems. Such documents, which are preferably personalized and plan-specific, may be automatically generated based on the plan details. Thus a user is spared the task of having to produce same. The analysis and measurements illustrate the projected outcomes in the form of indexes.

Figure 11:
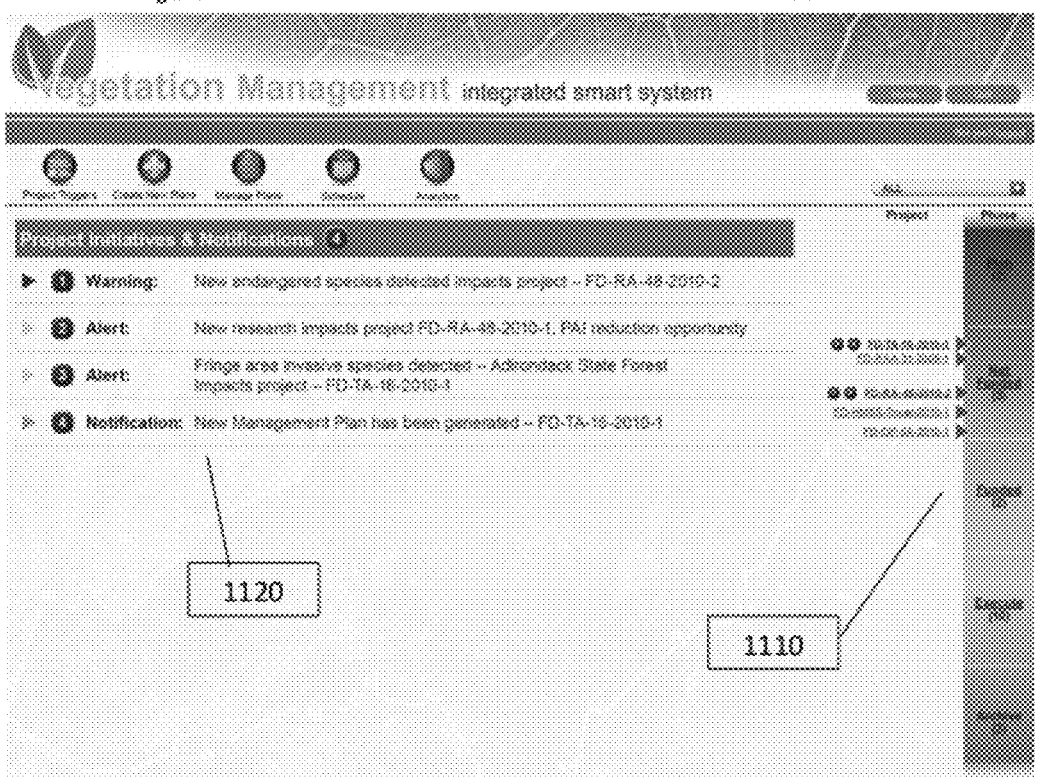

FIG. 11 illustrates an exemplary screen 1100, which may be the home page of a web site that provides access to the vegetation control plan generator 110 for a user who is managing multiple plans. In this embodiment, passwords and usernames are required for access to the vegetation control plan generator, and control the organization, data access, and functionality that are available through the home page. They are also used to direct workflow and authority, and limit access to metrics and sensitive data. In this exemplary system, users and roles are established and managed in the system administrative modules.

Project initiatives 1110 are displayed on the main body of the screen. New initiatives may arrive daily. A new initiative can be a new project but often an initiative is an update and modification to a project that is already in planning or in some stage of execution, as in the example here. In the example, these initiatives may relate to newly released research, newly released products, newly passed legislation, newly begun fringe area projects, among others. Each of these initiatives represents new data than may impact the project plan and may be used by the vegetation control plan generator to modify the plan in some manner.

While the foregoing has described what are considered to be the best mode and/or other examples of the present invention, it is understood that various modifications can be made therein and that the subject matter disclosed herein can be implemented in various forms and examples, and that the teachings can be applied in numerous applications, only some of which have been described herein.

What is claimed is:

1. A method comprising:
   receiving, by a vegetation control plan generator, information regarding controlling unwanted vegetation from at least one of a user, a database, a data feed, and a remote sensor via a communication network;
   automatically generating, by the vegetation control plan generator, one or more vegetation control plans for controlling unwanted vegetation in one or more locations based upon the received information;
   automatically evaluating, by the vegetation control plan generator, the one or more vegetation control plans according to one or more criterion;
   selecting, by the vegetation control plan generator, one of the generated vegetation control plans responsively to the evaluation; and
   providing, by the vegetation control plan generator, the selected vegetation control plan to the user via the communication network, wherein providing the selected vegetation control plan includes presenting aspects of the selected vegetation control plan for review by the user in a fashion which demonstrates recommendations for one or more aspects included in the selected vegetation control plan and user modification of some or all of those recommendations.

2. The method of claim 1, further comprising:
   receiving, by the vegetation control plan generator, additional information regarding the selected vegetation control plan from at least one of the user, the database, the data feed, and the remote sensor; and
   automatically updating, by the vegetation control plan generator, the selected vegetation control plan based upon the received additional information; and
   providing, by the vegetation control plan generator, an updated version of the selected vegetation control plan to the user via the communication network.

3. The method of claim 1, further comprising:
   receiving, by the vegetation control plan generator, additional information regarding vegetation control plans for projects which are adjacent, regional, or relevant to the selected vegetation control plan from at least one of the user, the database, the data feed, and the remote sensor; and automatically updating, by the vegetation control plan generator, the selected vegetation control plan based upon the received additional information; and providing, by the vegetation control plan generator, an updated version of the selected vegetation control plan to the user via the communication network.

4. The method of claim 1, further comprising the vegetation control plan generator automatically generating a modified vegetation control plan based on an attribute of information concerning an attribute of the selected vegetation control plan received subsequent to the selected vegetation control plan being provided.

5. The method of claim 1, wherein the one or more control plans include multiple attributes, the attributes concerning at least one of a site to execute a subject vegetation control plan, unwanted vegetation, resources available to execute the vegetation control plan, a site treatment strategy and plan, individual resources available to execute the subject vegetation control plan, local knowledge regarding vegetation control, planned events, remotely sensed site conditions, visually entered site conditions, weather data, and unplanned events.

6. The method of claim 1, wherein each of the one or more vegetation control plans include a logistics plan that provides logistical instructions and options for organizing at least one of resource allocation and resource movement.

7. The method of claim 1, wherein the selected vegetation control plan contains measurements of the plan including at least one of an efficiency index, an effectiveness index, a time index, and a cost index.

8. The method of claim 1, further comprising:
determining, by the vegetation control plan generator, a status for one or more resources utilized to implement the vegetation control plan; and
providing, by the vegetation control plan generator, an alert to the user responsively to the determined status.

9. The method of claim 1, further comprising:
determining, by the vegetation control plan generator, a potential impact of utilizing a resource to execute a portion of the selected vegetation control plan; and
providing, by the vegetation control plan generator, at least one of an analysis and a recommendation based upon the determined potential impact of the utilization to the user.

10. The method of claim 1, further comprising:
determining, by the vegetation control plan generator, a potential impact of utilizing a strategy to execute a portion of a selected vegetation control plan; and
providing, by the vegetation control plan generator, at least one of an analysis and a recommendation based upon the determined potential impact of the strategy to the user.

11. The method of claim 1, wherein the received information includes at least one of climate data, historical weather data, current weather data, and predicted weather data, the method further comprising updating, by the vegetation control plan generator, the selected vegetation control plan as one or more of climate data, historical weather data, current weather data, and predicted weather data is received.

12. The method of claim 1, wherein the received information includes at least one of new product data, new research data, new best practices data, and new regulatory data, the method further comprising updating, by the vegetation control plan generator, the selected vegetation control plan as one or more of new product data, new research data, new best practices, and new regulatory data is received.

13. The method of claim 1, wherein the received information includes one or more of information regarding a planned event, an unplanned event, a contractual requirement, a financial requirement, a plant requirement, a treatment requirement, a resource utilization, local knowledge, resource availability, remotely sensed information, information received via a resource, and information received via a computer-implemented social network.

14. The method of claim 1, wherein the received information includes a vegetation control plan outcome, the method further comprising:
determining, by the vegetation control plan generator, a best practice for controlling unwanted vegetation based on the vegetation control plan outcome; and
updating, by the vegetation control plan generator, the selected vegetation control plan responsively to the determined best practice.

15. The method of claim 1, wherein information is received from a piece of equipment utilized to implement at least a portion of the selected vegetation control plan, and said selected vegetation control plan is updated, by the vegetation control plan generator, to reflect consequences of the information received from said equipment.

16. The method of claim 1, wherein the received information includes remotely sensed data relating to the unwanted vegetation and a location of a site where the unwanted vegetation is located, the method further comprising:
determining, by the vegetation control plan generator, a size and border of the site containing the unwanted vegetation based upon an analysis of the remotely sensed data.

17. The method of claim 1, wherein the received information includes remotely sensed data relating to the unwanted vegetation and a location of a site where the unwanted vegetation is located, the method further comprising:
determining, by the vegetation control plan generator, a status of the unwanted vegetation based upon an analysis of the remotely sensed data.

18. The method of claim 1, wherein the recommendations are designated through the use of coded indicators on a user interface screen.

19. The method of claim 1, wherein the recommendations include recommendations for one or more of a treatment strategy, treatment products, and treatment procedures.

20. The method of claim 1, wherein presenting aspects of the selected vegetation control plan for review by the user includes prohibiting the user from modifying at least some aspects of the selected vegetation control plan.

21. The method of claim 1, further comprising:
generating, by the vegetation control plan generator, a set of instructions for execution of a portion of the selected vegetation control plan; and
providing, by the vegetation control plan generator, the set of instructions to at least one of the user, a manager, the database, the data feed, the remote sensor, and a piece of equipment utilized to execute a portion of the selected vegetation control plan.

22. The method of claim 21, wherein the set of instructions is personalized for at least one of the user, the manager, the database, the data feed, the remote sensor, and the piece of equipment.

23. The method of claim 1, wherein the selected vegetation control plan is provided to another individual for monitoring execution of the selected vegetation control plan.

24. A system comprising:
a vegetation control plan generator configured to receive information regarding vegetation control from a plurality of sources, automatically generate one or more vegetation control plans for controlling unwanted vegetation on a site based upon the received information, automatically evaluate the vegetation control plans according to one or more criteria, automatically select one of the vegetation control plans responsively to the evaluation, and automatically provide the selected vegetation control plan to a user via a communication network, wherein the vegetation control plan generator is further configured to automatically select treatment products based on plant characteristics, site characteristics, and regulatory requirements; and at least one client communicatively coupled to the vegetation control plan generator via the communication network and configured to receive the selected vegetation control plan and present it to the user.

25. The system of claim 24, wherein the client hosts a user interface configured to receive the selected vegetation control plan from the vegetation control plan generator via the communication network, provide the selected vegetation control plan to the user, receive information regarding vegetation control from the user, and provide the received information regarding vegetation control to the vegetation control plan generator.

26. The system of claim 24, further comprising a database communicatively coupled to the vegetation control plan generator and configured to store at least one of the received information regarding vegetation control, the one or more vegetation control plans, and the selected vegetation control plan.

27. The system of claim 24, wherein the communication network is at least one of the Internet, a cloud computing network, a local area network (LAN), a wide area network (WAN), or a wireless LAN (WLAN).

28. The system of claim 24, wherein the vegetation control plan generator is further configured to receive additional information relating to a vegetation control outcome and determine a vegetation control best practice based on the received additional information, the system further comprising a database communicatively coupled to the vegetation control plan generator and configured to store the best practice.

29. The system of claim 24, wherein the vegetation control plan generator is further configured to automatically determine best practices for vegetation control plans.

30. The system of claim 24, wherein the received information comprises some or all of: site data, resource data, unwanted vegetation data, planned event data, unplanned event data, local knowledge data, climate data, logistics data, best practices data, geologic/geographic data, supplier and supplies data, regulatory data, financial data, and buyer data.

31. The system of claim 24, wherein the vegetation control plan generator is communicatively coupled to one or more of equipment used in implementing a vegetation control plan, remote sensors, user stations, manager stations, and computer-implemented social networks to receive the information.

32. The system of claim 24, wherein the vegetation control plan generator is further configured to automatically receive data from equipment used in implementing the selected vegetation control plan.

33. The system of claim 24, wherein the vegetation control plan generator is further configured to automatically receive data from remote sensors.

34. The system of claim 24, wherein the vegetation control plan generator is further configured to automatically receive information for generating the vegetation control plans from computer-based social networks.

35. The system of claim 24, wherein the vegetation control plan generator is further configured to update the selected vegetation control plan according and responsive to information concerning weather, new product data, new research data, new best practices information, unplanned events, and new regulatory information.

36. The system of claim 24, wherein the vegetation control plan generator is further configured to provide the user with hypothetical vegetation control plans according to user-supplied criteria.

37. The system of claim 24, wherein the vegetation control plan generator is further configured to automatically prevent the user from specifying deviations from one or more plan attributes.

38. The system of claim 24, wherein the vegetation control plan generator is further configured to automatically pass instructions to equipment used in implementing the selected vegetation control plan.

39. The system of claim 24, wherein the vegetation control plan generator is further configured to automatically generate a set of instructions to execute at least a part of the plan, said instructions personalized for people and equipment executing the selected vegetation control plan.

40. A method comprising:
receiving, by a vegetation control plan generator, information regarding controlling unwanted vegetation from at least one of a user, a database, a data feed, and a remote sensor via a communication network;
automatically generating, by the vegetation control plan generator, one or more vegetation control plans for controlling unwanted vegetation in one or more locations based upon the received information;
automatically evaluating, by the vegetation control plan generator, the one or more vegetation control plans according to one or more criterion;
selecting, by the vegetation control plan generator, one of the generated vegetation control plans responsively to the evaluation;
providing, by the vegetation control plan generator, the selected vegetation control plan to the user via the communication network;
determining, by the vegetation control plan generator, a potential impact of utilizing a strategy to execute a portion of a selected vegetation control plan; and
providing, by the vegetation control plan generator, at least one of an analysis and a recommendation based upon the determined potential impact of the strategy to the user.

41. The method of claim 40, further comprising:
receiving, by the vegetation control plan generator, additional information regarding the selected vegetation control plan from at least one of the user, the database, the data feed, and the remote sensor;
updating, by the vegetation control plan generator, the selected vegetation control plan based upon the received additional information; and
providing, by the vegetation control plan generator, an updated version of the selected vegetation control plan to the user via the communication network.

42. The method of claim 40, further comprising:
receiving, by the vegetation control plan generator, additional information regarding vegetation control plans for projects which are adjacent, regional, or relevant to the selected vegetation control plan from at least one of the user, the database, the data feed, and the remote sensor; and
updating, by the vegetation control plan generator, the selected vegetation control plan based upon the received additional information; and providing, by the vegetation control plan generator, an updated version of the selected vegetation control plan to the user via the communication network.

\* \* \* \* \*